Feb. 26, 1924.　　　　　　　　　　　　　　1,485,036
F. KINGSLEY
UNIVERSAL JOINT.
Filed Aug. 10, 1920

Inventor
Francis Kingsley
By Attorneys
Redding & Greely

Patented Feb. 26, 1924.

1,485,036

UNITED STATES PATENT OFFICE.

FRANCIS KINGSLEY, OF NEW ROCHELLE, NEW YORK.

UNIVERSAL JOINT.

Application filed August 10, 1920. Serial No. 402,562.

*To all whom it may concern:*

Be it known that I, FRANCIS KINGSLEY, a citizen of the United States, residing in the city of New Rochelle, of the State of New York, have invented certain new and useful Improvements in Universal Joints, of which the following is a specification, reference being had to the accompanying drawings, forming a part hereof.

This invention relates to a universal joint applicable to shafts whose axes substantially intersect and has for its general object to provide an improved joint which will fix the point of intersection of such axes and transmit the driving torque while permitting relatively free angular movement between the shafts at high speeds. A further object of the invention is to attach directly to the proximate ends of shaft sections a flexible member which has the axes of its opposite ends substantially co-axial with the respective axes of the shaft sections. More particularly the invention resides in connecting the opposite ends of a flexible cylindrical member to the proximate ends of shaft sections, the cylindrical member being flexible transversely and permitting rotation of the shafts through large angles without distortion of any of the parts and with little noise and friction. A further object of the invention is to provide a universal joint which is subjected to the slightest degree of mechanical wear and requires little lubrication. Still another object is to associate with the free ends of shaft sections a flexible joint element which serves to transmit the driving torque through large angles and yet holds two shafts sections in proper relation with respect to a fixed point of intersection of their axes.

Details of one embodiment of the invention will be described in connection with the accompanying drawings in which—

Figure 1:
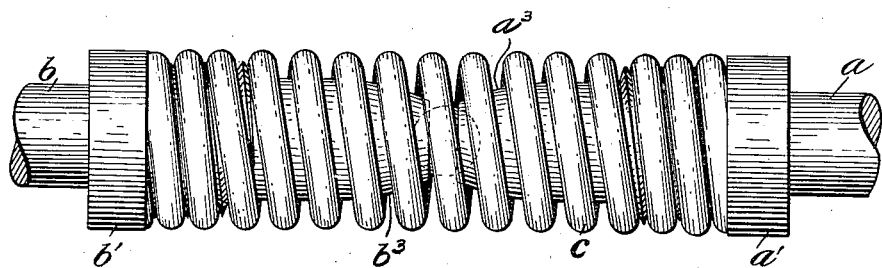
Figure 1 is a view in elevation of the proximate free ends of two shaft sections having associated therewith the improved universal joint.
Figure 2:
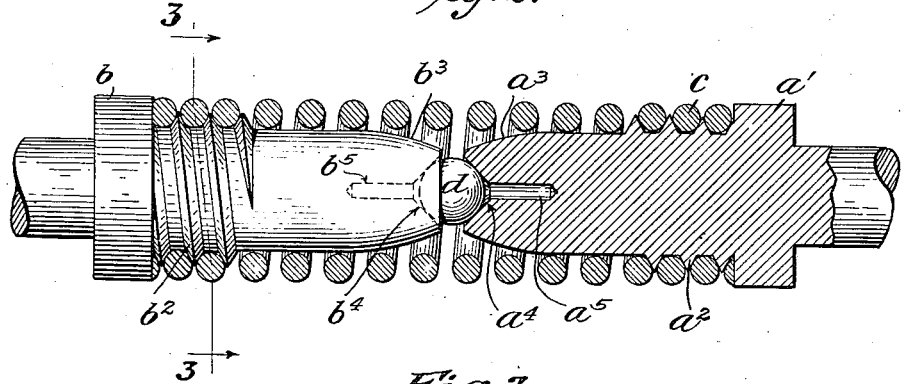
Figure 2 is a view similar to Figure 1 but showing the joining spring in section and one of the shaft ends in section.
Figure 3:
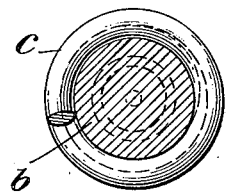
Figure 3 is a view in transverse section through one of the shafts taken on the planes indicated by the line 3—3 of Figure 2 and looking in the direction of the arrows.

The improved joint is designed primarily with reference to its use on shafts having relatively free ends, that is, with shafts having no end bearings to maintain them in fixed relation. Further, the invention contemplates the provision of a universal joint as distinguished from a flexible coupling in that means are provided for fixing the point of intersection of the axes of the shafts. The invention is not concerned with a mere flexible coupling in which the shafts rotate in fixed relation and with no relative angular movement.

The ends of the two shafts $a$, $b$, which are to be joined may have formed thereon or may carry collars $a'$, $b'$ respectively constituting stops or seats for the opposite ends of a coiled spring $c$. Each of these shafts $a$, $b$, is also formed with threads $a^2$, $b^2$, respectively extending outwardly from the respective collars $a'$, $b'$, these threads being of such amplitude and pitch as to receive the coils of the spring $c$ in threaded relation therewith. The end of each of the shaft sections $a$, $b$ is truly cylindrical, for a distance extending outwardly from the collars $a'$, $b'$ respectively, such cylindrical portion being of a diameter slightly less than the inside diameter of the spring, to give a little clearance for allowing the spring a small amount of play when in use. At the extreme end each shaft is tapered as at $a^3$, $b^3$, respectively and terminates in a recess $a^4$, $b^4$, respectively, on the nose of the shaft. The recesses $a^4$, $b^4$, are of such size as to receive a hardened centering ball $d$ which rests within the recesses and fixes the point of intersection of the axes of the shafts $a$, $b$. The ends of the shafts $a$, $b$ may be further countersunk as at $a^5$, $b^5$ to provide a lubricant pocket to receive a suitable lubricant, such as vaseline, for the ball $d$.

From the description given it appears that the spring $c$ can be threaded readily on to the threaded sections $a^2$, $b^2$ of the respective shafts until the end coils of the spring, which may be flattened abut against the stop collars $a'$, $b'$. Further rotation of the spring in either direction then becomes impossible. The spring rests along the truly cylindrical portions of the ends of the shafts $a$, $b$, for the most part, while the abutting tapered ends of the shafts hold the ball $d$. Rotative movement of either of the shafts $a$ will be transmitted through the coil of the spring $c$ to the other of the shafts $b$, the spring constantly tending to tighten along the threads $a^2$, $b^2$ and jamming against the stop collars $a'$, $b'$. When in position it is desirable that the spring shall be of such length and the parts of the shafts so dimensioned that some tension will be set up and the ends of the shafts drawn together to maintain the ball $d$ within the pockets $a^4$, $b^4$. During angular movement of the shafts $a$, $b$ about the ball $d$ the spring $c$ will bend freely transversely but the driving torque will be transmitted through the spring with maximum efficiency and without distortion of any of the parts. The smallest amount of mechanical friction and heat will be set up in the joint and no lubrication of it is essential although it may be desirable to provide the countersunk lubricant retainers $a^5$, $b^5$ for the centering ball $d$.

As pointed out hereinbefore and as will now be plain, the flexible joint element $c$ might find other embodiment than as a coiled spring, without departing from the principle of the invention. It is also evident that this flexible element when formed as the spring need not be connected directly to the shaft sections through threads formed thereon. The ends of the spring might be anchored to the respective shafts by other mechanical means. Where a flexible cylinder of some other form than a coiled spring is employed to transmit the torque the ends of such an element can be clamped to the shafts by suitable retaining devices selected for the purpose by a skilled mechanic. The essence of the present invention resides in the direct connection to the proximate ends of the shafts of a flexible cylindrical joint element which will bend transversely about a fixed point of intersection of the axes of the shafts. Such a joint is herein further characterized by the co-axial relation between its opposite ends and the respective shafts.

I claim as my invention:

1. In combination, a drive shaft, a driven shaft, threads near the end of one of said shafts, spring engaging means near the other end of said shafts, the adjacent ends of the shafts being recessed to accommodate a ball, and a coil spring into which the ends of the shaft are inserted and the ends of which respectively engage with the said threads and said spring engaging means.

2. In combination with a driving and a driven shaft, threads on said shafts near the ends thereof, the ends of the shafts being formed to receive a free centering ball between them, a coil spring into which the ends of the shafts are inserted and which engages with said threads, and abutment means on said shafts against which the ends of the spring engage.

3. In combination with a drive shaft and a driven shaft having recesses in their approximate ends, a freely movable ball positioned between the ends of said shafts and seated in said recesses, and a tubular flexible element into which the ends of said shafts extend, and with the opposite ends of which the shafts are operatively engaged.

4. In combination, a drive shaft and a driven shaft, each formed with a stop collar near the end thereof, and formed with a cylindrical, screw-threaded section extending outwardly from the collar, and with a tapered end in which is formed a recess with a counterbore to receive a lubricant, a universal joint connection between said shafts comprising a coiled spring threaded onto the threaded portions of said shafts, and a centering ball located in the recesses in the ends of the shafts.

This specification signed this 9th day of Aug. A. D. 1920.

FRANCIS KINGSLEY.